(12) United States Patent
Reed et al.

(10) Patent No.: US 6,714,787 B2
(45) Date of Patent: Mar. 30, 2004

(54) METHOD AND APPARATUS FOR ADAPTING A ROUTING MAP FOR A WIRELESS COMMUNICATIONS NETWORK

(75) Inventors: John Douglas Reed, Arlington, TX (US); Jack Anthony Smith, Bedford, TX (US)

(73) Assignee: Motorola, Inc., Schaumburg, IL (US)

( * ) Notice: Subject to any disclaimer, the term of this patent is extended or adjusted under 35 U.S.C. 154(b) by 7 days.

(21) Appl. No.: 10/052,136

(22) Filed: Jan. 17, 2002

(65) Prior Publication Data

US 2003/0134644 A1 Jul. 17, 2003

(51) Int. Cl.[7] .............................. H04Q 7/20; H04B 3/36; H04B 7/14
(52) U.S. Cl. ................. 455/445; 455/426.2; 455/436; 455/450; 455/453; 455/7
(58) Field of Search ................................ 370/254, 255, 370/328, 329, 437, 468, 338; 455/445, 450, 451, 452, 453, 7, 11.1, 426.2, 12.1, 13.1, 15, 16, 20, 24, 25, 509, 517, 436; 709/221, 223, 226, 229, 227, 238, 239

(56) References Cited

U.S. PATENT DOCUMENTS

| | | | | |
|---|---|---|---|---|
| 5,319,638 A | * | 6/1994 | Lin ............................ 370/235 |
| 5,974,236 A | * | 10/1999 | Sherman ..................... 709/221 |
| 6,249,516 B1 | * | 6/2001 | Brownrigg et al. ......... 370/338 |
| 6,310,881 B1 | * | 10/2001 | Zikan et al. ................ 370/401 |
| 6,347,091 B1 | * | 2/2002 | Wallentin et al. ........... 370/437 |
| 6,446,125 B1 | * | 9/2002 | Huang et al. ............... 709/226 |
| 2001/0027106 A1 | * | 10/2001 | Kito ............................ 455/453 |
| 2001/0036810 A1 | * | 11/2001 | Larsen ....................... 455/11.1 |
| 2002/0027894 A1 | * | 3/2002 | Arrakoski et al. .......... 370/338 |
| 2002/0077151 A1 | * | 6/2002 | Matthews et al. .......... 455/561 |
| 2002/0114332 A1 | * | 8/2002 | Apostolopoulos et al. .. 370/392 |
| 2002/0118667 A1 | * | 8/2002 | Chintada et al. ............ 370/349 |
| 2002/0126664 A1 | * | 9/2002 | Kiiski et al. ................ 370/389 |
| 2002/0176363 A1 | * | 11/2002 | Durinovic-Johri et al. .. 370/237 |
| 2003/0026222 A1 | * | 2/2003 | Kotzin ....................... 370/335 |

FOREIGN PATENT DOCUMENTS

EP    1246415 A2  *  10/2002   ........... H04L/12/56

* cited by examiner

Primary Examiner—Vivian Chin
Assistant Examiner—Raymond B. Persino
(74) Attorney, Agent, or Firm—Posz & Bethards, PLC; Charles W. Bethards

(57) ABSTRACT

A wireless control unit (WCU) arranged and constructed to operate as a wireless router within a wireless network and to facilitate dynamic reconfiguration of a routing map within the wireless network and method thereof, the WCU including a receiver for receiving a presented load; a transmitter for transmitting a transmitted load; a controller for; scheduling the presented load to be transmitted on a number of wireless links with other nodes; and dynamically increasing or decreasing a number of wireless links with other nodes within the wireless network to increase a network capacity, decrease an average queue size at the WCU, decrease an average latency for the network, or decrease an average latency for a portion of the presented load that is destined for another WCU.

16 Claims, 5 Drawing Sheets

METHOD AND APPARATUS FOR ADAPTING A ROUTING MAP FOR A WIRELESS COMMUNICATIONS NETWORK

FIELD OF THE INVENTION

This invention relates in general to communication systems, and more specifically to a method and apparatus for adapting a routing map for a wireless communications network.

BACKGROUND OF THE INVENTION

The traditional approach used for terrestrial wireless communication networks such as cellular networks consists of dividing the desired coverage area into a set of overlapping regions, where all of the subscribers within each region are served from a single transceiver known as a base station using a point-to-multipoint (PMP) or one-to-many approach. One of the problems with a PMP architecture is that it becomes more difficult to establish links directly between a given subscriber radio and the base station as the transmission carrier frequency increases, which poses a problem for future wireless networks since they are increasingly being deployed at higher carrier frequencies.

Other problems are the economic burdens associated with deploying a system since large costs are incurred during deployment of the infrastructure before any revenue can be raised to offset those expenses. Additionally there are extensive problems of coordination and planning and expense associated with expanding such systems. To avoid or address these problems to one extent or another, a new type of network architecture known as "mesh" architecture is being explored. Some systems are being proposed and deployed for providing relatively broadband packet data services to residential customers. Some fixed wireless systems or networks that are part PMP and part mesh network have been proposed and may be referred to as hybrid systems or networks. These systems may be initially deployed in part as PMP systems with each of the communications units in the PMP arrangement also acting as wireless network access points for clusters of communications units operating in a mesh network arrangement.

In a mesh architecture a multiplicity of communications units are deployed, normally one or more per household or business and operate in an ad-hoc peer to peer fashion to establish links where possible and as required among each of a given units neighbors. For example, units can establish links or paths with several other units particularly where as is typical the units employ an omni-directional antenna. Some units can employ a directional antenna to limit their ability to see (establish links with) units that are not in the direction of their antenna while improving there ability to see units in the direction of the antenna. Some units typically operate as hybrid units or in a hybrid mode, partly in a PMP mode and partly in a mesh mode. These units may be coupled to a base station using a PMP link or path where the base station acts as a wide area network (WAN) access point. The same unit will operate in a mesh mode for and with other units in its vicinity effectively representing a network access point for the other units. This mesh network at the end of a PMP link is often referred to as a cluster.

Each or many of the communications units have the ability to relay communications signals from an originating communications unit to a target unit when these communications units are not able to create a direct communication link or path from one to the other unit. Information that is being communicated may be relayed or handed from communications unit to communications unit until it reaches the intended destination or target unit. Note: that if the direct link from one unit to another were interrupted by, for example a tree growing or new building being constructed, the inherent redundancy in the mesh architecture allows routing the information through a third unit or routing unit. In this fashion the infrastructure or backbone that is represented by the traditional base stations and supporting equipment is in a sense deployed as the system gains customers and begins to realize revenue.

However the mesh architecture or system and particularly the hybrid system can also experience problems. Note that all traffic to and from the WAN must pass through a relatively small number of units, namely those having access to the WAN. In the hybrid network all WAN traffic goes through the base station. The links from the base station are PMP links meaning that ordinarily only one link can be active at a time. If the units or wireless communications units (WCUs) at the end of these links are low data rate units at least in the PMP mode too many such links can adversely effect capacity or throughput from the base station. Conversely too few such PMP links can also adversely effect capacity as too much of the load is being pushed to few WCUs or wireless routers. Obviously better methods and apparatus for adapting routing maps in such wireless networks are needed.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF PREFERRED EMBODIMENT

Figure 1:
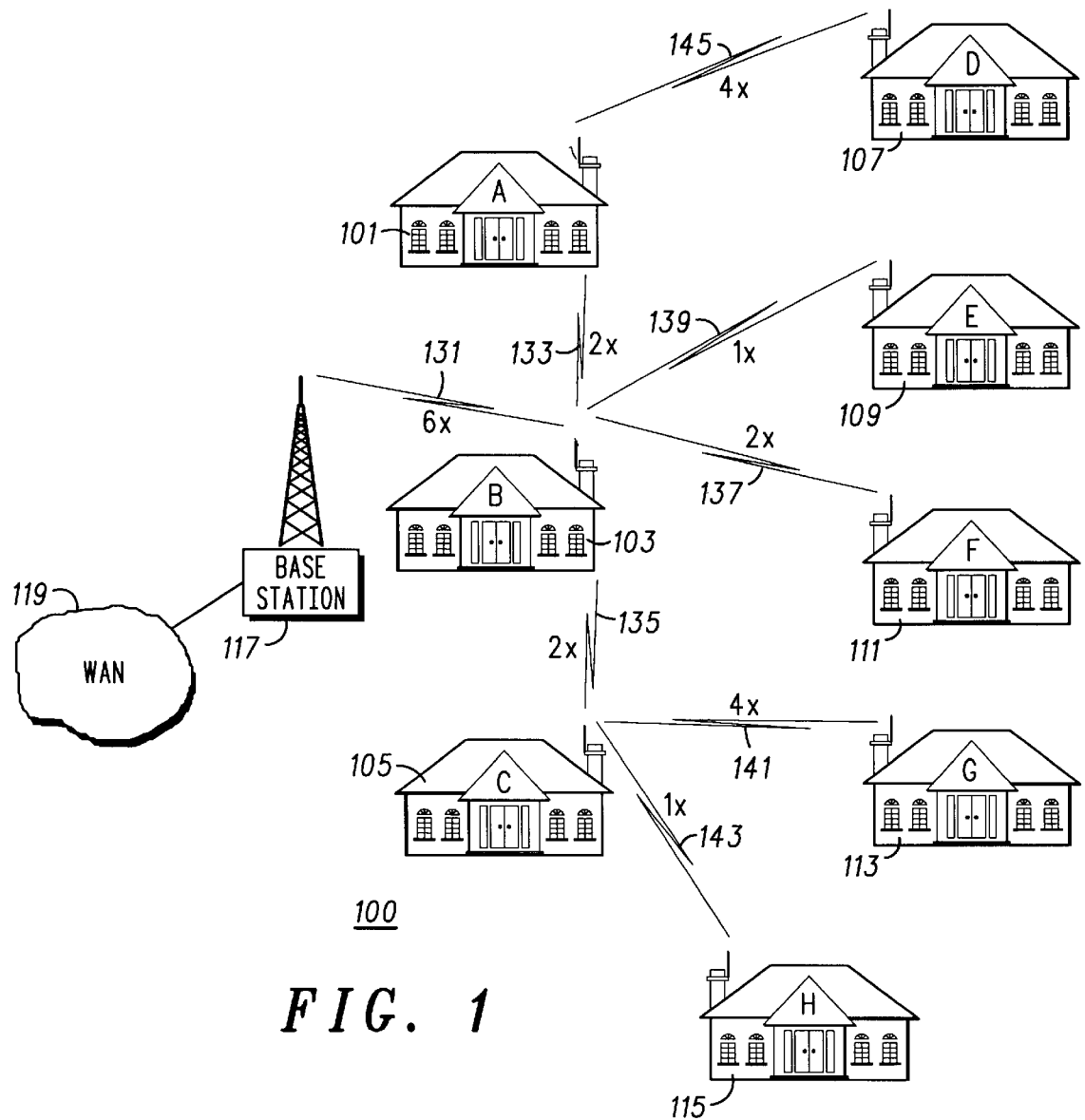
FIG. 1 depicts, in a simplified and exemplary form, a wireless communications network and routing map therein that demonstrates a possible overload condition at a wireless router.

In overview form the present disclosure concerns communications systems that provide service to communications units or more specifically users thereof operating therein. More particularly various inventive concepts and principles embodied in methods and apparatus for improving service availability by adjusting or adapting routing maps in a mesh or hybrid (combination of mesh and point to multipoint (PMP)) communications system or network are discussed.

The communications systems of particular interest are those being deployed and developed, commonly referred to as fixed wireless networks, with nodes or wireless communications units (WCUs) that operate in an ad-hoc manner to form links amongst peers (mesh architecture) or in a PMP mode and thus collectively as a network. Such systems typically operate in the 2–40 GHz range and often under ISM (unlicenced) frequency allocations and rules. Normally they are best suited for wireless packet data communications systems and may be expected to employ IP addressing techniques including IPv6. To-date mobility within such systems is limited to relatively small ranges.

As further discussed below various inventive principles and combinations thereof are advantageously employed to adapt routing maps by adjusting the number of links available to or that need to be supported by a communications unit within the network in a manner that enhances capacity or decrease latency as needed by the wireless communications network or particular users thereof. This will alleviate various problems associated with known systems and enhance capacity available to more wireless communications units and thus users provided these principles or equivalents thereof are utilized.

The instant disclosure is provided to further explain in an enabling fashion the best modes of making and using various embodiments in accordance with the present invention. The disclosure is further offered to enhance an understanding and appreciation for the inventive principles and advantages thereof, rather than to unfairly limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions. Much of the inventive functionality and many of the inventive principles are best implemented in part or total with or in software programs or instructions. Similarly much of the functionality and principles may be implemented in part or total in varying forms of hardware such as integrated circuits. It is expected that one of ordinary skill, notwithstanding possibly significant effort and many design choices motivated by, for example, available time, current technology, and economic considerations, when guided by the concepts and principles disclosed herein will be readily capable of generating such hardware and software instructions and programs with minimal experimentation. Therefore further discussion of such hardware and software, if any, will be limited to higher level concepts and functions in the interest of brevity and minimization of any risk of obscuring the principles and concepts in accordance with the present invention.

FIG. 1 depicts, in a simplified and exemplary form, a wireless communications network including a routing map therein that demonstrates a possible overload condition at a wireless router or wireless communications unit B 103. It is expected that a discussion of FIG. 1 will help provide some common language as well as familiarize the reader with some of the problems of present systems and some of the opportunities envisioned by the principles and concepts according to the present invention. Included in the system 100 is a multiplicity of wireless communications units (WCUs) shown generally as open rectangles with antennas A–H, 101–115. These units are subscriber units that would be expected to be deployed one or more per household or business location to provide a gateway or access to and from other resources or other users at other locations for local or private area networks and users of such units at the households and business locations. These WCUs or subscriber units are also peer units in a mesh network and would be used or expected to route or relay information from a source unit to a destination unit as required. Each unit typically can see or is within communications range of a number of other units and thus can form links or communications paths or channels with those other units. Each or many of the WCUs, in addition to WCU B, can also relay information or signals from an originating WCU to a target WCU and there may be more than one such relay to complete a connection between the two. This redundancy, the ad-hoc nature of these links and the formation of them, and the relay capabilities are some of the attractions of mesh networks.

Unit B 103 is shown coupled to a base station 117 in a PMP mode over a link 131 with 6× capacity. The base station 117 is shown as a gateway or access point to a wide area network (WAN) 119 such as the PSTN or Internet and thus, presumably, an access point or gateway to other base stations and hence other groups or clusters of WCUs. Some of the units in addition to B, such as A and C 101, 105 are suitable and possibly suited to operating in a PMP mode, when required, to provide a link to the Base station for the users they support as well as a router for other subscribers. Note although referred to generally as a base station, this station for purposes of the principles and concepts discussed herein is merely another WCU or routing node in the wireless network.

Each of the WCUs 101–115 and 117 are depicted as coupled or connected to one or more other of such units via links 131–145, with each link shown with an exemplary capacity or link capacity such as 1×, 2×, 4×, etc. These links collectively are typically referred to or may be thought of as a routing map. For example traffic or the load at base station 117 having a destination of WCU D 107 or a destination that goes through WCU D would be routed through B 103 to A 101 and thus to WCU D 107. Each link will need to support traffic or the load that is presented by the source WCU. This load presented to the link includes traffic destined for or consumed by the target or terminating node as well as any load or traffic that is routed through that node or WCU.

This network can use spread spectrum, such as frequency hopped or code division, or time division, or frequency division multiple access technologies but will be described herein, to the extent judged necessary, in terms of a time division duplex system. The system can use one or more known modulation techniques and protocols for the various stack levels. For example 802.11a is a time division duplex (TDD) system that specifies Orthogonal Frequency Division Multiplexing (OFDM) with multi-level modulation and coding to achieve data rates that may be selected based on the signal to noise ratio of the channel. Generally the base station will be able to see or hear and establish links with several of the remaining WCUs if such WCUs are equipped to operate in a PMP mode, but only able to service or support a link with one WCU at any one instant in time. Furthermore, typically a very small number of the WCUs are equipped and so positioned as to support a relatively high rate link with the base station with the remaining ones that are able to support a PMP link doing so at a relatively low transfer or transport rate. Economic considerations and regulations, such as those promulgated by the Federal Communications Commission or like regulatory bodies, effectively limit the number of WCUs that are able to support a high rate link in a PMP mode.

The amount of traffic or load carried by a link can be limited in three manners: 1. the demand or traffic or load presented to the link determines or equals the amount transported; 2. the link capacity limits or determines the amount or load transmitted or transported and this is less than the load or traffic offered or presented, and 3. the rate at which the destination or terminating node will accept traffic or load determines the amount transported. The first situation can occur because the load available to or the load presented to the source node or WCU that is to be routed over that link determines the load carried by the link or alternatively the load presented to the source node is greater than the source node is able to present to or make available to the link, due, for example, to time devoted to servicing other links. So long as all links are experiencing the former the system capacity would appear to be sufficient while the latter is not so desirable and the present disclosure will discuss techniques for addressing this problem.

The second and third situation, from above, likely have similar impacts on system capacity and possibly similar solutions that can be addressed using the inventive techniques discussed herein. However the third situation, likely resulting from a queue at the terminating or destination node for a link growing beyond or approaching a limit, may be partially addressed by enlarging the available size of the queue, albeit at an undesirable economic cost for memory for the queue as well as an undesirable impact on latency for traffic or load routed through that queue. Note that a given node or queue for that node must support traffic or load from all links that is to routed to other links through that node. It is likely that a great deal of this traffic will originate from the WAN but some will also originate within the local mesh network and in isolated cases possibly a great deal will originate locally.

In any event, FIG. 1 demonstrates a potential example of situation number 3 where a bottleneck can or may develop at WCU B 103 when the queue at this node exceeds a fixed limit or size or, if the amount of memory available for the queue is large, where network latencies can be become excessive or greater than some or most customers will tolerate. By observation, traffic or load can be presented or offered at a 6× rate and only forwarded or routed or transmitted to other nodes at a 1× or 2× rate. Specifically link 133 is a 2× link serving WCU A 101 and WCU D 107, link 135 is a 2× link serving WCU C 105, WCU G 113, and WCU H 115, link 137 is a 2× link serving WCU F 111, and link 139 is a 1× link serving WCU E 109. Thus WCU B 103 and ultimately base station 117 are likely to see a presented load that is greater than a transmitted load and thus a queue at WCU B 103 that is increasing in size and average latencies that are growing. Base station 117 would experience these problems when WCU B quit accepting the offered load at the rate offered over link 131. Note that in the event, however unlikely, a significant portion of the presented or offered load from the base station is destined for users connected to WCU B 103, the transmitted load from WCU B including that consumed locally or transmitted to local users and that which is forwarded or routed may still exceed the presented load.

Figure 2:
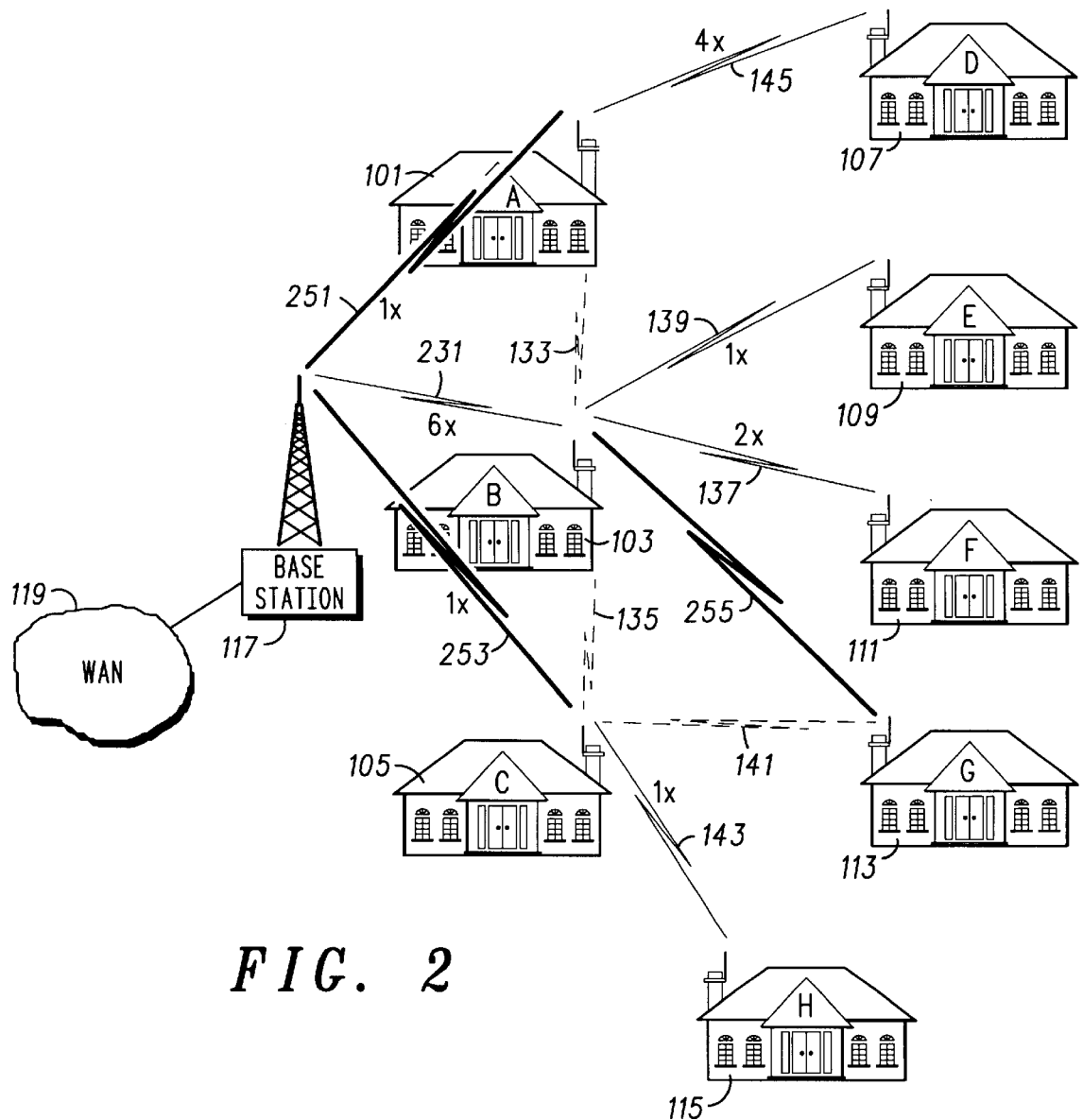
FIG. 2 depicts, in a simplified and representative form, the FIG. 1 network with a routing map adapted according to a preferred embodiment of the present invention.

FIG. 2 depicts, in a simplified and representative form, the FIG. 1 network with a routing map adapted according to a preferred embodiment of the present invention. Here it has been determined that WCU A 101 and WCU C 105 can or are available to be and they have been reconfigured to operate in a PMP mode. This routing map includes new PMP links 251 and 253 that are low rate 1× links serving, respectively, WCU A 101, WCU D 107 and WCU C 105, WCU H 115. Additionally the link 231 while still a high or higher rate 6× link no longer carries the same traffic so has been designated with a different reference numeral. The 2× links 133, 135 from WCU B 103 have been disconnected and a new link 255 has been added to directly serve WCU G 113. Although WCU B may still experience bottleneck situations, namely where the offered or presented load over link 231 exceeds the transmitted load it should be significantly less often if at all. For one thing the averaged presented load will decrease because the base station now must spend some time supporting the new links 251 and 253 and since they are low rate links this time could be significant. Additionally since traffic for fewer WCUs is routed through WCU B 103 the maximum presented load should decrease as well.

Figure 3:
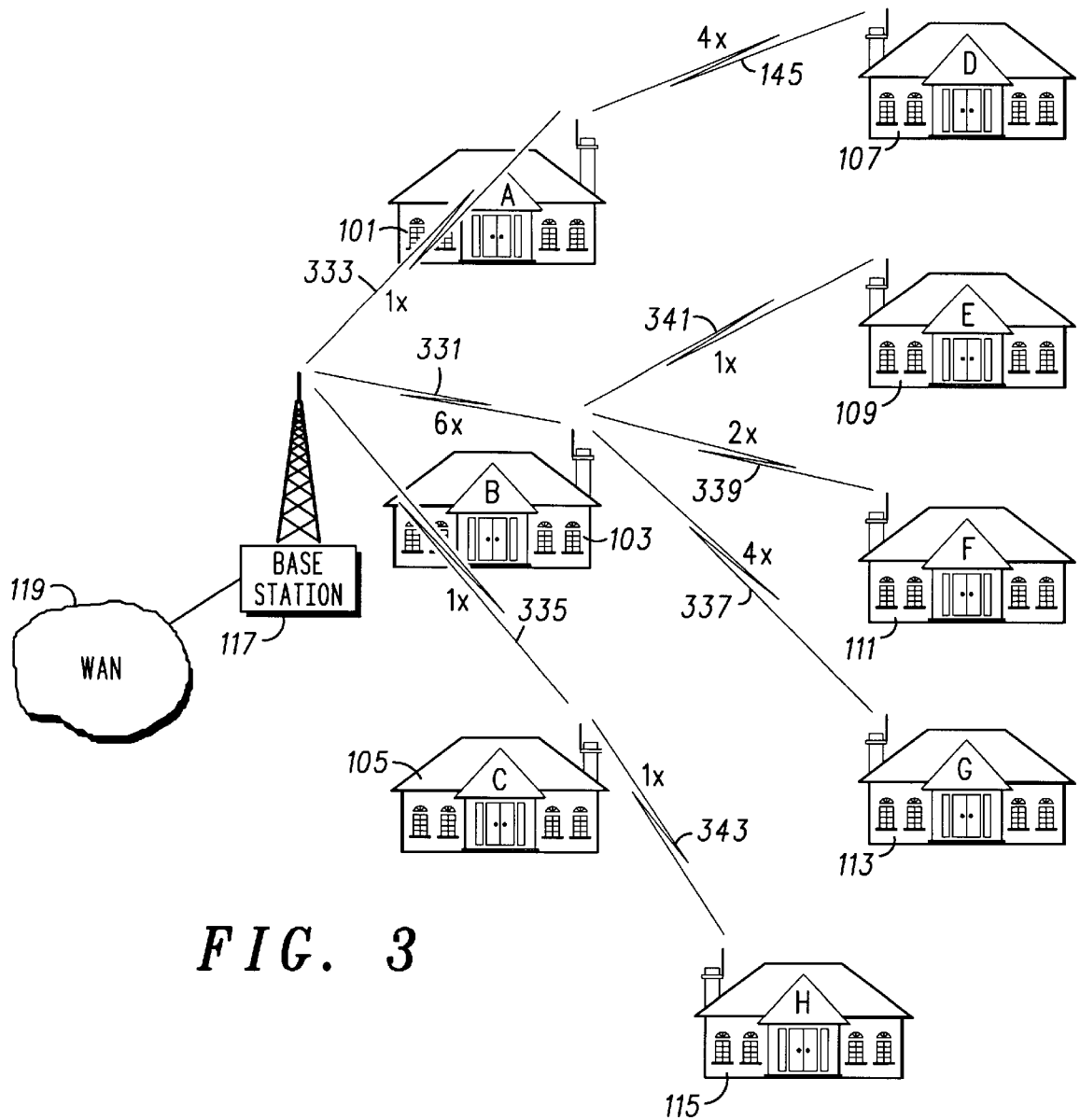
FIG. 3 depicts, in a simplified and exemplary form, a wireless communications network and a routing map therein that demonstrates a possible capacity problem at a WAN access point.

FIG. 3 depicts, in a simplified and exemplary form, a wireless communications network and a routing map therein that demonstrates a possible capacity problem at a WAN access point, specifically the base station 117. The reader will note some similarities to the topology of FIG. 2. FIG. 3 shows three PMP links, namely link 333 and 335 are 1× low rate links serving, respectively, WCU A 101, WCU D 107 and WCU C 105, WCU H 115 while 331 is a higher rate 6× link serving node WCU B 105 and WCUs E–G 109–113. With this topology and these links the potential exists for so much of the presented load at base station 117 to be destined or directed to nodes or WCUs via the 1× links 333, 335 that the base station does not have enough capacity or time to adequately service the high rate link 331 or alternatively at least that an opportunity exists to improve network capacity or available network capacity so as to better match the offered or available load and thus reduce network latencies.

Figure 4:
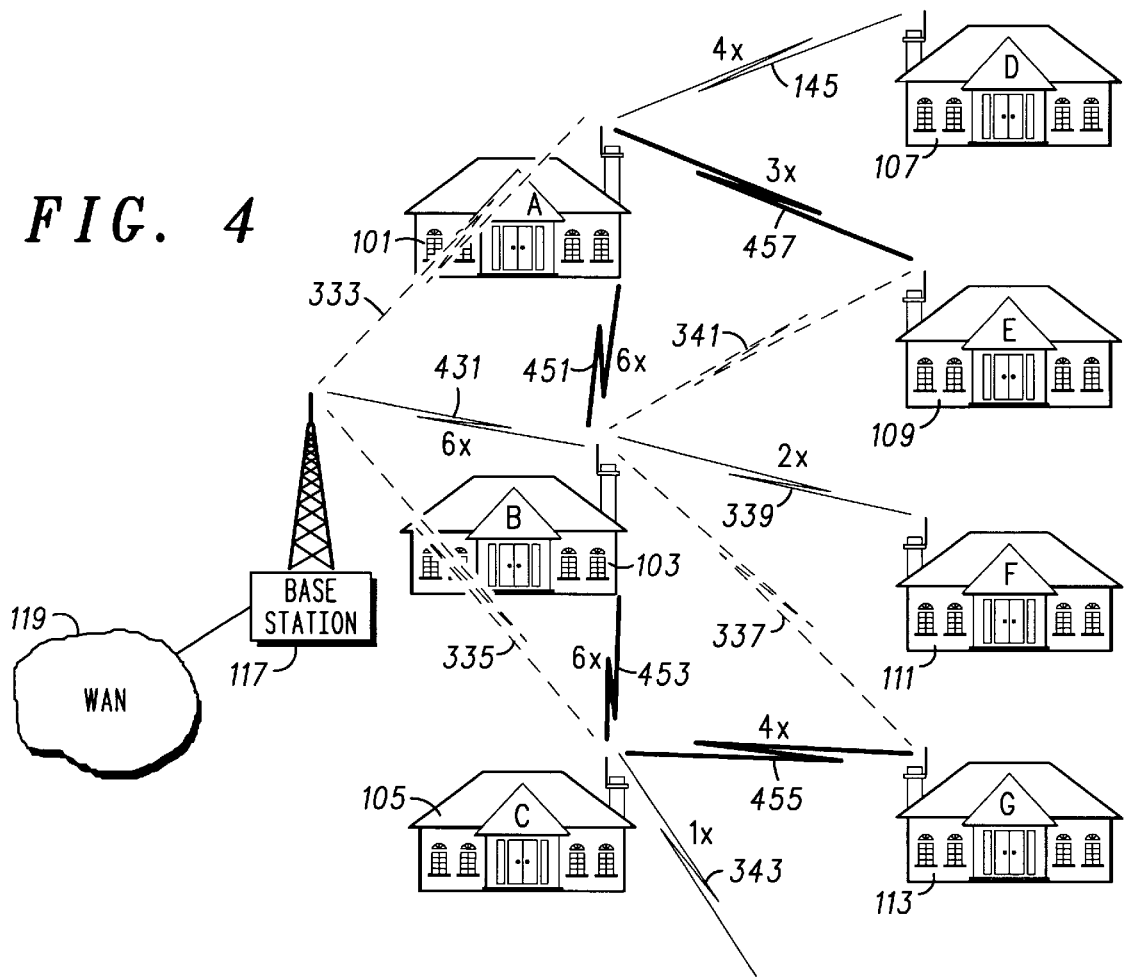
FIG. 4 illustrates, in a simplified and representative form, the FIG. 3 network with a routing map adapted according to a further preferred embodiment according to the present invention.

FIG. 4 illustrates, in a simplified and representative form, the FIG. 3 network with a routing map adapted according to a further preferred embodiment of the invention. In this instance, rather than add PMP links, the load dynamics and available links are such that the low rate 1× links 333, 335 have been disconnected or dropped and WCU A 101 and WCU C 105 reconfigured to operate as mesh units with traffic or load routed through WCU B 103 over, respectively, new higher rate 6× links 451, 453. Additionally links 333 and 341 from WCU B have been dropped and new links 455 and 457 established to service, there respective WCUs G and E. With the new routing map Base station 117 can spend essentially all available time supporting the higher rate 6× link 431 to WCU B 103 and WCU B 103 can forward or transmit traffic at a 6× rate for two or three links and a 2× rate for the third link that it supports. Essentially the FIG. 2 routing map relative to FIG. 1 given the exemplary dynamics discussed improved the networks absorption of traffic or load and the FIG. 4 routing map relative to the FIG. 3 exemplary dynamics discussed improves the average data rate out of the base. It should be apparent that the best solution inevitably is a question of load and link dynamics and will thus be a dynamic one or one that requires continual and regular or routine adaptation of the routing map for the wireless network.

Figure 5:
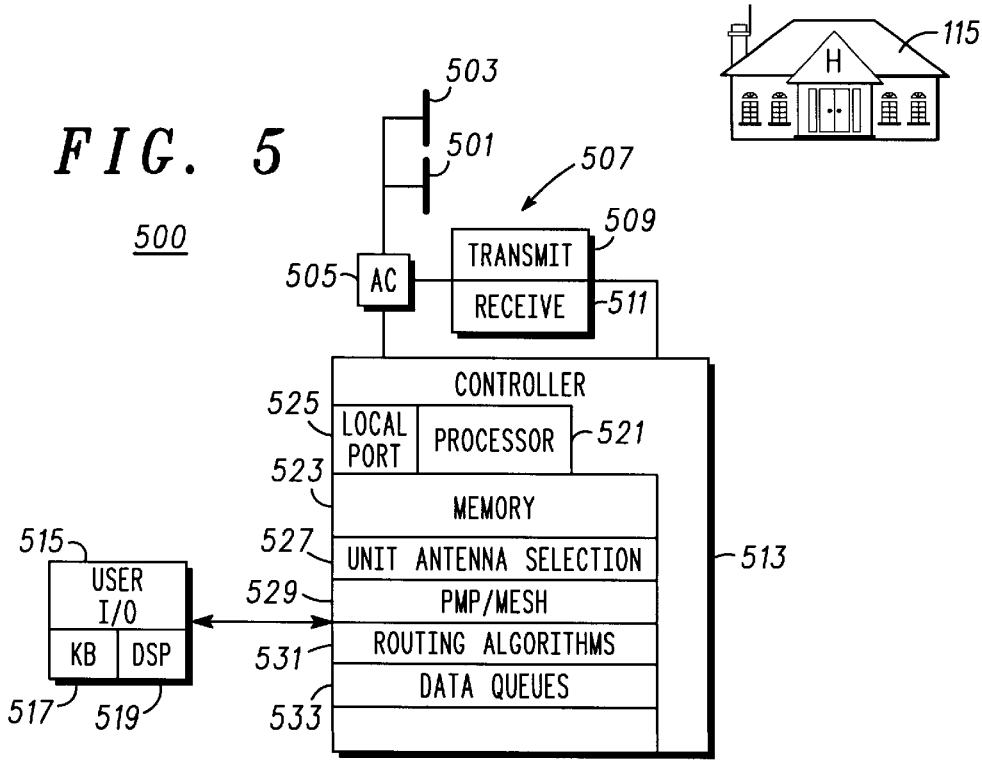
FIG. 5 shows a block diagram of a preferred embodiment of a wireless communications unit in accordance with the present invention.

FIG. 5 shows a block diagram of a preferred embodiment of a WCU 500 suitable for use as any of the WCU 101–115 of FIGS. 1–4 or the base station 117. As an overview the WCU is arranged and constructed to operate as a wireless node to provide service for subscribers connected thereto and as a wireless router within a wireless network to facilitate service to or for other subscribers or user within the network and to facilitate dynamic reconfiguration of a routing map within or for the wireless network. The WCU includes a transceiver 507, specifically, a receiver 511 for receiving a presented load, a transmitter 509 for transmitting a transmitted load; and a controller 513, coupled to the receiver and the transmitter. In overview form the controller 513 is for scheduling the load as presented to be transmitted on a number of wireless links with other nodes according to their respective availability and dynamically adjusting the number of wireless links with other nodes within the wireless network pursuant to increasing a network capacity, decreasing an average queue size at the WCU, decreasing an average latency for the network, or decreasing an average latency for a portion of the presented load that is destined for another WCU. In certain cases this adjustment will be responsive to the controller determining that the presented load is greater than the transmitted load or that the queue size has exceeded some threshold in general or that the queue size or amount of traffic within the queue intended for some destination has exceeded a threshold for that destination.

In more detail the preferred embodiment of the WCU includes an antenna system that further includes antennas or antenna structures 501, 503, preferably, a first and higher visibility, possibly directional antenna 503 suitable for providing or supporting a PMP link with, for example, the base station 117 and a second and possibly lower visibility antenna 501 suitable for facilitating one or more links with other mesh mode WCUs, and an antenna controller 505 that is arranged to provide for selection of one or more of the antennas 501, 503. This dual antenna system is optional and likely available, if at all, on the WCUs that are selectively configurable to operate in either or both a PMP mode and a mesh mode. The antenna system inter-couples signals to a transceiver 507 that is included in the WCU 400. The transceiver includes the receiver 511 for receiving signals from and the transmitter 509 for transmitting or sending signals to the fixed wireless network, specifically other WCUs or wireless resources in the network. The transceiver is comprised of and operates according to various known radio frequency technologies. The transceiver and antenna system are coupled to a controller 513 and the controller is, preferably, coupled to a user input output function (I/O) 515 that, preferably, includes a conventional keyboard 517 or keys and display 519. The user 10 allows for a user to interact with the WCU as needed.

The controller 513 includes a processor 521, preferably a microprocessor that is widely available from manufacturers such as Intel and Motorola and that is coupled to a local port 525 and a memory 523. The local port is often a known 10/100 base T port or equivalent that will typically interface to a local or private area network (LAN) such as found in a household or small business establishment or a local modem and computer according to known and particular network practices or specifications. This interface will allow and provide for connectivity for users of that LAN via the fixed wireless network to other users and resources. In the base station this local port will be coupled to the WAN via a, likely high capacity, network link such as, for example, a T1 link in addition to any local network or load.

The memory is, preferably, comprised of a combination of RAM, ROM, PROM, and possibly magnetic memory all as is known. The memory 423 includes software instructions and parameters that when executed and utilized by the processor causes the controller to control the transceiver and antenna system to send and receive signals from other WCUs in accordance with the protocols and other operational conventions that will depend on the particular network. In particular the WCUs that are capable of operating in a PMP as well as mesh mode, such as WCUs A, B, C 101, 103, 105, will require instructions and parameters, PMP/MESH 529, suitable for causing the controller to control the transceiver and various signal processing functions, preferably within the controller, to operate or function according to the conventions of the particular network and network PMP and mesh protocols. More particularly the memory includes one or more antenna selection routines 527 for the WCU or unit's transmitter and receiver. In addition the memory includes routing algorithms 531 that are in accordance with the principles and concepts discussed and disclosed herein. Other routine routing algorithms, not further relevant or discussed, are known or being developed for routing within a mesh or fixed wireless network that are also likely to be dependent on the operating conventions of the particular network. The Website:

www.cse.ucsc.edu/research/ccrg/projects/wings.html includes a number of papers on routing algorithms that may be informative. Furthermore the memory includes memory space for traffic or load or data queues 533 or databases for storing data received via the local port or from one WCU until it can be relayed, routed transmitted or sent to a further WCU.

We have disclosed a wireless communication unit (WCU) 500 that is arranged and constructed to operate as wireless router and that dynamically reconfigures a routing map for the WCU. The WCU includes the receiver for receiving a presented load; the transmitter for transmitting a transmitted load; and the controller. The controller schedule the presented load to be transmitted on a number of wireless links with other nodes and determines whether the presented load is greater than the transmitted load; and if so dynamically adjusts the number of wireless links with other nodes to increase a transmit rate when the presented load is greater than the transmitted load. This dynamic adjustment of the number of links can include reducing or increasing the number of links or dropping some links and adding some links depending on circumstances and objectives. For example, the discussion above and FIG. 2 shows an example where a WCU or controller therein, specifically the base station 117 has increased the number of links by converting WCU A and C 101, 105 to PMP units and setting up links 251, 253. Conversely FIG. 4 and the discussion above demonstrate an instance where existing PMP links 333, 335 have been dropped and WCU A and C converted to mesh operation. By observation one can see other links within the routing maps of FIG. 2 and FIG. 4 that have been added and dropped either singularly or together in order to better match an offered or presented load with a transmitted load thereby increasing system capacity and reducing queue sizes and the corresponding latency associated with data transport.

In more detail when the number of links is reduced you generally want to drop one or more lower rate links and retain or perhaps even add higher rate links. Of course prior to dropping a lower rate link or causing the lower rate link to be disconnected the controller of the initiating WCU, for example the base station 117, will need to make sure that the higher rate link is part of a path now existing or that can be established that can support any destinations that are being served by the lower rate link. The controller operating to send or causing the transmitter to send an inquiry concerning the destination over the higher rate link and then receiving a favorable response regarding the support can accomplish this. A favorable response would acknowledge that a path exists and, preferably that average transmit or delivery rates to this destination over this path would be similar or better than those presently being experienced by that destination.

In more detail when the dynamic adjustment to the number of links includes increasing the number of links, such as in FIG. 2, the links that are added must support one or more destinations that are presently supported by an existing link in order to provide any relief for the existing links or WCU that terminates the existing link. The controller operates or causes the transceiver to operate to send an inquiry concerning the destination over the existing link and receive a response indicating an average transmitted rate for a path to the destination. This information can be used to select a link to be added from a plurality of possible links based on the amount of traffic that will be removed from the existing link with due care to the level of service to be provided to the destination when the new link is used. It may still be advisable from an overall system perspective to add the link even though a given destination ends up with poorer service.

As earlier noted in passing the WCU can be operating as or operable as a base station in a point to multi point mode and the dynamically adjusting the number of links includes adding or dropping a point to point link and adjusting or reconfiguring a destination node or WCU to operate, respectively, in a PMP or a mesh mode. The trigger for adjusting the number of links or attempting to do so in addition to the relative size of the presented and transmitted load can be the size of the queue or, specifically the queue exceeding some threshold. This threshold would be selected according to latency expectations at given nodes in known manners. It may be that the initiation of adjusting the number of links includes the controller initiating a queue status report that is forwarded or sent to a source of the offered load when said queue approaches or exceeds a threshold.

Figure 6:
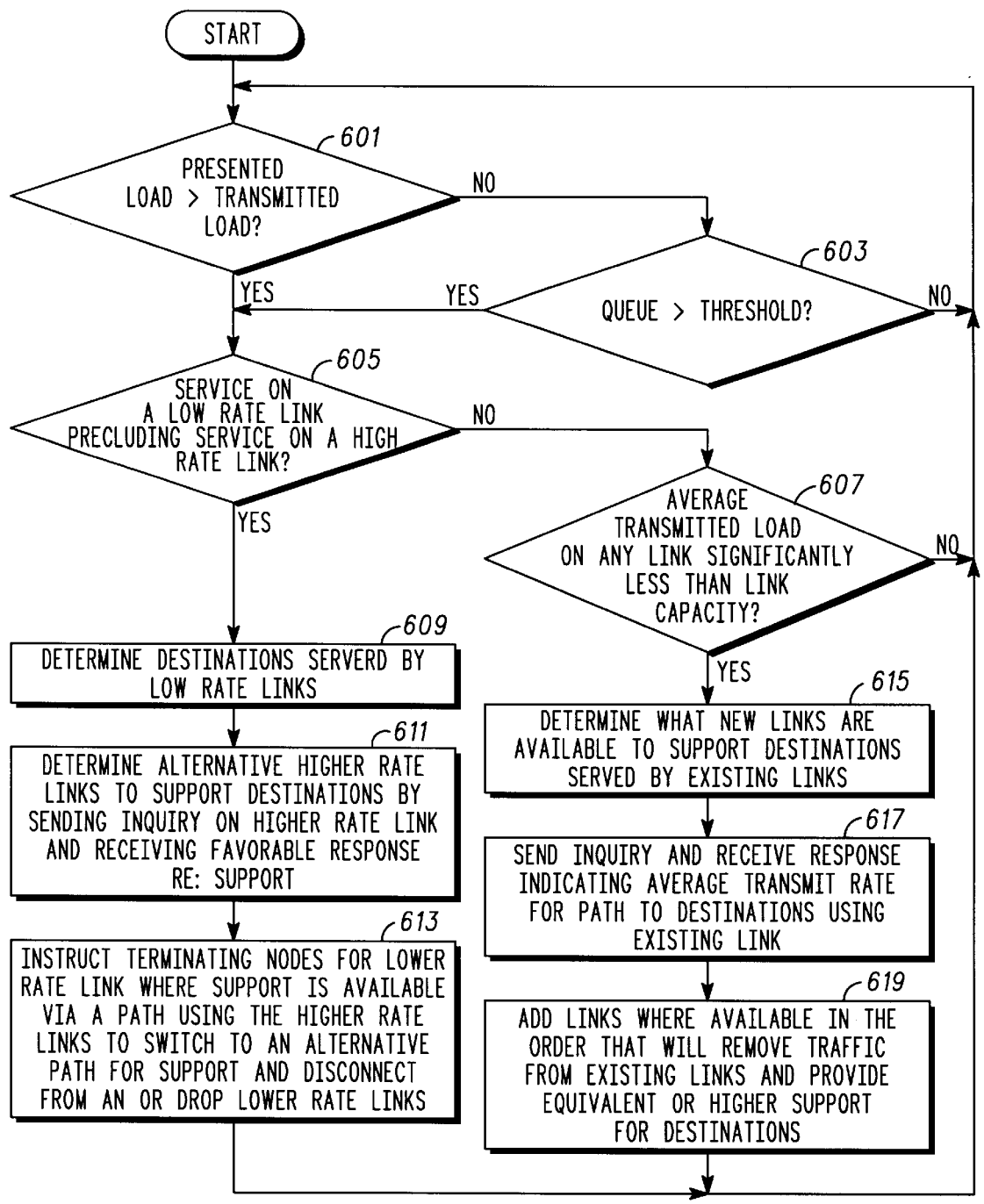
FIG. 6 depicts a flow chart of a preferred method embodiment according to the present invention.

One further embodiment, depicted in the flow chart of FIG. 6, is a method 600 of dynamically reconfiguring a routing map for a routing node within a wireless communications system. This method may be practiced in the WCUs and networks, discussed above. The method includes determining when the node is receiving a presented load that is greater than a transmitted load at 601 and if not whether a queue has exceeded a threshold at 603. If neither, the process returns to step 601 and repeats. If either has occurred, the process moves to step 605 and determines whether service on a low rate link is precluding or interfering with service on a or for a higher rate link. This is the situation that was described with reference to FIG. 3. If not, step 607 determines whether the average transmitted load on any link is significantly less that that links capacity. Note this may be a somewhat redundant question because it is unlikely that one will get positive answers at steps 601 or 603 and a negative answer at 605 unless indeed the answer at 607 is positive. In any event if the result at 607 is negative the process returns to 601 and repeats. If the results at step 605 or 607 is positive the balance of the process dynamically adjusts a number of wireless links with other nodes to increase a transmit rate when the presented load is greater than the transmitted load or a queue size, ether in general or for a specific destination has exceeded a threshold.

When the result at 605 is positive the steps 609–613 operate to adjust the number of links by appropriately reducing the number of links, preferably by dropping one or more low rate links and retaining or possibly adding one or more high rate links. Step 609 determines destinations now served by low rate links and step 611 determines alternative higher rate links, preferably, a higher rate link that already exists, to support these destinations. This is accomplished at step 611 by sending an inquiry concerning these destinations over the high rate link and receiving a favorable response regarding this support. Step 613 instructs terminating nodes for lower rate links where support is available via a path using the higher rate links to switch to an alternative path for support and disconnect form or drop the lower rate links. The process then repeats form step 601.

The steps 615–619 following an affirmative response at step 607 operate to appropriately increase the number of links. Step 615 determines the availability of or discovers one or more new links that will support destinations now or presently served by existing links. Step 617 sends an inquiry and receives a response indicating average transmit rate for a path to destinations using existing links. Step 619 increases the number of links by adding links, where available, in the order that will remove traffic from existing links and still, preferably, provides equivalent or better support for the destinations. In short the links to be added are selected from a plurality of possible links based on the amount of traffic that will be removed from the existing link. After step 619 the process returns to step 601 and repeats. The method may be advantageously practiced is a wireless base station operating in a point to multi point mode and the step of dynamically adjusting the number of links will includes adding or dropping a point to point link and adjusting a destination or node or terminating WCU to operate, respectively, in a PMP or a mesh mode.

The apparatus and processes, discussed above, and the inventive principles thereof are intended to and will alleviate problems caused by prior art fixed wireless networks. Using these principles of dynamically adjusting the types and numbers of links with other WCUs as above described is expected to minimize network latencies and expected queue sizes at WCUs and optimize network capacity according to the dynamics of presented loads. Using these principles and concepts the capacity accorded one user could be greater than another or viewed another way a better grade of service can be provided to some users over others. This capability to provide differential service among user as well as generally enhance network capacity will thus facilitate connectivity for today and tomorrows consumers.

Various embodiments of systems, methods, and apparatus for adjusting the number of these links thus providing or facilitating the providing of services in a fixed wireless network in an efficient and effective manner have been discussed and described. It is expected that these embodiments or others in accordance with the present invention will have application to many wireless local area networks that provide connectivity for their user or subscriber devices or units as well as such networks that are coupled to fixed or wired WANS such as the PSTN or internet. The disclosure extends to the constituent elements or equipment comprising such systems and specifically the methods and apparatus employed thereby and therein. Using the inventive principles and concepts disclosed herein advantageously allows or provides for low latency and low network overhead access or links among communications units or devices and procedures for maintaining such access which will be beneficial to users and providers a like.

This disclosure is intended to explain how to fashion and use various embodiments in accordance with the invention rather than to limit the true, intended, and fair scope and spirit thereof. The invention is defined solely by the appended claims, as may be amended during the pendency of this application for patent, and all equivalents thereof.

What is claimed is:

1. A method of dynamically reconfiguring a routing map for a routing node within a wireless communications system, the method comprising:
   determining when the node is receiving a presented load that is greater than a transmitted load; and
   dynamically adjusting a number of wireless links with other nodes to increase a transmit rate when said presented load is greater than said transmitted load, wherein said dynamically adjusting said number of links further includes sending an inquiry concerning a destination and receiving a response regarding support for the destination and wherein said dynamically adjusting said number of links additionally includes reducing said number of links and wherein said reducing the number of links includes dropping a low rate link and retaining a high rate link;
   determining that said high rate link is part of a path that will support the destination served by said low rate link; and
   sending said inquiry concerning said destination over said high rate link and said receiving said response further comprises receiving a favorable response regarding said support.

2. The method of claim 1 wherein said dynamically adjusting said number of links includes increasing said number of links.

3. The method of claim 2 wherein said increasing said number of links includes adding a link that will support said destination that is presently supported by an existing link.

4. The method of claim 3 wherein said sending an inquiry further comprises sending said inquiry concerning said destination over said existing link and said receiving said response further comprises receiving a response indicating an average transmitted rate for a path to said destination.

5. The method of claim 3 wherein said link is selected from a plurality of possible links based on the amount of traffic that will be removed from said existing link.

6. The method of claim 1 wherein said routing node is a wireless base station operating in a point to multi point mode and said dynamically adjusting said number of links includes one of adding and dropping a point to point link and adjusting a destination to operate, respectively, in one of a PMP and a mesh mode.

7. A wireless communication unit (WCU) arranged and constructed to operate as wireless router that dynamically reconfigures a routing map for the WCU, the WCU comprising in combination:
   a receiver for receiving a presented load;
   a transmitter for transmitting a transmitted load;
   a controller, coupled to said receiver and said transmitter, for;
      scheduling said presented load to be transmitted on a number of wireless links with other nodes;
      determining when said presented load is greater than said transmitted load; and
      dynamically adjusting said number of wireless links with other nodes to increase a transmit rate when said presented load is greater than said transmitted load; and
      operating to send an inquiry concerning a destination and receive a response regarding support for the destination;
   wherein said controller dynamically adjusts said number of links by dropping a lower rate link and retaining a higher rate link;
   wherein said controller further determines that said higher rate link is part of a path that will support said destination served by said lower rate link; and
   wherein said controller operating to send said inquiry concerning said destination over said higher rate link and to receive a favorable response regarding said support.

8. The WCU of claim 7 wherein said controller dynamically adjusts said number of links by increasing said number of links.

9. The WCU of claim 8 wherein said increasing said number of links includes adding a link that will support said destination that is presently supported by an existing link.

10. The WCU of claim 9 wherein said controller operating to send an inquiry further operates to send said inquiry concerning said destination over said existing link and to receive a response indicating an average transmitted rate for a path to said destination.

11. The WCU of claim 9 wherein said link to be added is selected from a plurality of possible links based on the amount of traffic that will be removed from said existing link.

12. The WCU of claim 7 operable as a base station in a point to multi point mode and said dynamically adjusting said number of links includes one of adding and dropping a point to point link and adjusting said destination to operate, respectively, in one of a PMP and a mesh mode.

13. The WCU of claim 7 further including a memory for serving as a queue for said presented load and said controller further for dynamically adjusting said number of wireless links to increase said transmit rate when said queue exceeds a threshold.

14. The WCU of claim 7 further including a memory for serving as a queue for said presented load and said controller further for initiating a queue status report to a source of said presented load when said queue exceeds a threshold.

15. A method of dynamically reconfiguring a routing map for a routing node within a wireless communications system, the method comprising:
   determining when the node is receiving a presented load that is greater than a transmitted load; and
   dynamically adjusting a number of wireless links with other nodes to increase a transmit rate when said presented load is greater than said transmitted load, wherein said dynamically adjusting said number of wireless links further includes sending an inquiry concerning a destination and receiving a response regarding support for the destination, and additionally includes increasing said number of links;
   wherein said increasing said number of links includes adding a link that will support said destination that is presently supported by an existing link; and
   wherein said sending an inquiry further comprises sending said inquiry concerning said destination over said existing link and said receiving said response further comprises receiving a response indicating an average transmitted rate for a path to said destination.

16. A wireless communication unit (WCU) arranged and constructed to operate as wireless router that dynamically reconfigures a routing map for the WCU, the WCU comprising in combination:
   a receiver for receiving a presented load;
   a transmitter for transmitting a transmitted load;
   a controller, coupled to said receiver and said transmitter, for;
      scheduling said presented load to be transmitted on a number of wireless links with other nodes;

determining when said presented load is greater than said transmitted load; and dynamically adjusting said number of wireless links with other nodes to increase a transmit rate when said presented load is greater than said transmitted load; and operating to send an inquiry concerning a destination and receive a response regarding support for the destination;

wherein said controller dynamically adjusts said number of links by increasing said number of links;

wherein said increasing said number of links includes adding a link that will support said destination that is presently supported by an existing link; and wherein said controller operating to send an inquiry further operates to send said inquiry concerning said destination over said existing link and to receive a response indicating an average transmitted rate for a path to said destination.

* * * * *